Patented Apr. 28, 1953

2,636,880

UNITED STATES PATENT OFFICE 2,636,880

PROCESS FOR THE PRODUCTION OF ETHYLENIMINES

Wilson A. Reeves, George L. Drake, and Carroll L. Hoffpauir, New Orleans, La., assignors to the United States of America as represented by the Secretary of Agriculture No Drawing. Application July 19, 1951, Serial No. 237,657

5 Claims. (Cl. 260—239)

(Granted under Title 35, U. S. Code (1952), sec. 266)

This invention herein described may be used by or for the Government of the United States of America for governmental purposes throughout the world without the payment to us of any royalty thereon.

This invention relates to the production of paraffinic ethylenimines, particularly ethylenimine and its homologs, from 2-aminoalkyl hydrogen sulfates and has among its objects the provision of a process for producing these ethylenimines in a substantially pure form and in high yield.

As heretofore practiced, the conversion of a 2-aminoalkyl hydrogen sulfate to an ethylenimine has been accomplished by mixing the sulfate with an excess of aqueous sodium hydroxide and distilling off the imine.

We have discovered that the rate at which the neutralized aminoalkyl hydrogen sulfate is heated in contact with excess base critically controls not only the yield but also the purity of the resulting imine. If a solution of the neutralized sulfate in contact with the base is substantially instantaneously raised from about room temperature to a temperature above the boiling point of the imine, the imine is volatilized as rapidly as it is formed and can be isolated in a pure form and in a high yield from the solvent which is volatilized along with the imine.

In a particularly preferred method of conducting the process of the invention, the aminoalkyl hydrogen sulfate is neutralized by dissolving the sulfate and a substantially equivalent amount of aqueous alkali metal hydroxide (from about 1.5 to 2.5 moles of hydroxide per mole of sulfate) to form an aqueous solution containing from 25 to 50% of dissolved materials based on the combined weight of hydroxide and sulfate and continuously adding this solution to a boiling aqueous solution containing from about 5 to 40%, preferably 10 to 20%, of an alkali metal hydroxide at a rate at which the volume of the boiling solution remains substantially constant.

The amount and concentration of the alkali metal hydroxide and the sulfate can be varied widely as long as the sulfate is contacted with enough hydroxide to neutralize its acidity and to render the solution basic, and as long as the concentration of salts does not render the solution viscous and thus prevent an intimate mixing of the reactants. The mixing of the sulfate and the hydroxide can be done either before or during the heating of the mixed reactants. For example, in the above method of conducting the process, the hydroxide can all be in the solution containing the sulfate, or can all be in the boiling liquid to which the solution containing the sulfate is added, or can be distributed in any proportion between the two solutions.

The process of the invention can be conducted by introducing the sulfate and the hydroxide (preferably in an aqueous solution, although any nonreactive solvent for both reactants can be used) into any heat exchange apparatus in which they are intimately mixed and substantially instantaneously raised to a temperature between the boiling point of the imine (or that of an azeotrope of the imine and the solvent) and the decomposition temperature of the imine.

The process of the invention can be conducted by the conventional methods of flash distillation, that is, by flash distilling an aqueous solution (preferably containing not more than about 50% dissolved solids) of the sulfate and the hydroxide, with the latter present in excess of the amount required to neutralize the sulfate.

The process can be conducted in a continuous or batchwise manner. While the process is convenient and efficient when conducted at atmospheric pressure any combination of pressures and temperatures substantially equivalent to the above temperatures with respect to the distillation of the imine can suitably be employed.

While substantially any non-volatile base soluble in a solvent for the 2-aminoalkyl hydrogen sulfate can be used, the alkali metal hydroxides, particularly sodium hydroxide, constitute the preferred bases for employment in the process.

Substantially any 2-aminoalkyl hydrogen sulfate, the corresponding imine of which boils below about 100° C. (or forms an imine-solvent azeotrope boiling below about 150° C.) can be suitably employed; however, the employment of one containing not more than about 4 carbon atoms is preferred.

The process of the invention inherently produces the imine in the form of a mixture with the solvent in which the reaction is conducted. Since water is suitable, cheap, and non-inflammable, in general the imine will be obtained in the form of an aqueous solution or mixture. The imine can readily be obtained in a substantially pure form by merely salting it out of solution with a water soluble base, preferably at a temperature below about 30° C.

The following example is presented to illustrate in detail a suitable method of conducting the process of the invention. However, it is apparent that many variations in materials, conditions and techniques are within the scope of the invention. The invention is not to be construed as being limited to the substances and methods mentioned in the example.

Ethylenimine was produced by adding 420 gms. of 2-aminoethyl hydrogen sulfate dissolved in 1800 mls. of water containing 250 gms. of sodium hydroxide to 100 mls. of a rapidly boiling 14% sodium hydroxide solution, at a rate at which the volume of the sodium hydroxide solution remained substantially constant. The distillation was continued until the reaction vessel was substantially dry.

The product was salted out by the addition of 1200 gms. of sodium hydroxide to the distillate while cooling to maintain its temperature at about 0°–30° C. It was removed by conventional mechanical separations. The product consisted of 128 mls. of ethylenimine boiling at 56° C. This represented a yield of 83% based upon the amount of 2-aminoethyl hydrogen sulfate used.

Having thus described our invention, we claim:

1. A process for the production of a paraffinic ethylenimine comprising continuously adding a solution containing about from 25 to 50% dissolved materials based on the combined weight of alkali metal hydroxide and 2-aminoalkyl hydrogen sulfate in the molar ratio of 1.5 to 2.5 moles of hydroxide per mole of sulfate, to a boiling aqueous solution containing from 5 to 40% alkali metal hydroxide at a rate at which the volume of the boiling solution remains substantially constant.

2. The process of claim 1 wherein the 2-aminoalkyl hydrogen sulfate contains not more than 4 carbon atoms.

3. The process of claim 1 wherein the 2-aminoalkyl hydrogen sulfate is 2-aminoethyl hydrogen sulfate.

4. A process for the production of a paraffinic ethylenimine comprising continuously adding a solution containing about from 25 to 50% dissolved materials based on the combined weight of alkali metal hydroxide and 2-aminoalkyl hydrogen sulfate in the molar ratio of 1.5 to 2.5 moles of hydroxide per mole of sulfate, to a boiling aqueous solution containing from 5 to 40% alkali metal hydroxide at a rate at which the volume of the boiling solution remains substantially constant, and isolating the formed paraffinic ethylenimine.

5. The process of claim 4 wherein the ethylenimine is isolated by salting it out of the distillate with an alkali metal hydroxide at a temperature below 30° C.

WILSON A. REEVES.
GEORGE L. DRAKE.
CARROLL L. HOFFPAUIR.

References Cited in the file of this patent

UNITED STATES PATENTS

| Number | Name | Date |
|---|---|---|
| 2,206,273 | Ulrich | July 2, 1940 |
| 2,212,146 | Berchet | Aug. 20, 1940 |
| 2,558,273 | Schlapfer et al. | June 26, 1951 |

OTHER REFERENCES

Allen et al.: Organic Synthesis, vol. 30, pp. 38–40 (1950).